United States Patent [19]
Sakurai

[11] Patent Number: 5,749,007
[45] Date of Patent: May 5, 1998

[54] CAMERA USING FILM HAVING A MAGNETIC MEMORY PORTION

[75] Inventor: Hiroshi Sakurai, Kawasaki, Japan

[73] Assignee: Canon Kabushiki Kaisha, Tokyo, Japan

[21] Appl. No.: 900,130

[22] Filed: Jul. 25, 1997

Related U.S. Application Data

[63] Continuation of Ser. No. 457,128, Jun. 1, 1995, abandoned.

[51] Int. Cl.⁶ .................................................. G03B 17/24
[52] U.S. Cl. ............................................................ 396/319
[58] Field of Search ........................................ 396/319, 320

[56] References Cited

U.S. PATENT DOCUMENTS

| | | | |
|---|---|---|---|
| 4,864,332 | 9/1989 | Harvey | 354/21 |
| 5,294,949 | 3/1994 | Robison et al. | 354/106 |
| 5,343,264 | 8/1994 | Itoh et al. | 354/106 |
| 5,477,289 | 12/1995 | Smart | 354/106 |
| 5,500,701 | 3/1996 | Itoh | 354/106 |

FOREIGN PATENT DOCUMENTS

| | | |
|---|---|---|
| 3-202830 | 9/1991 | Japan . |
| 4-340942 | 11/1992 | Japan . |

*Primary Examiner*—Daniel P. Malley
*Attorney, Agent, or Firm*—Fitzpatrick, Cella, Harper & Scinto

[57] ABSTRACT

A camera or an apparatus adapted to use a film with a magnetic memory portion, or a device adapted for such a camera or an apparatus has a magnetic head for at least one of writing information to the magnetic memory portion of the film and reading information from the magnetic memory portion, and a tool application portion for applying a tool for checking the performance of the magnetic head.

38 Claims, 7 Drawing Sheets

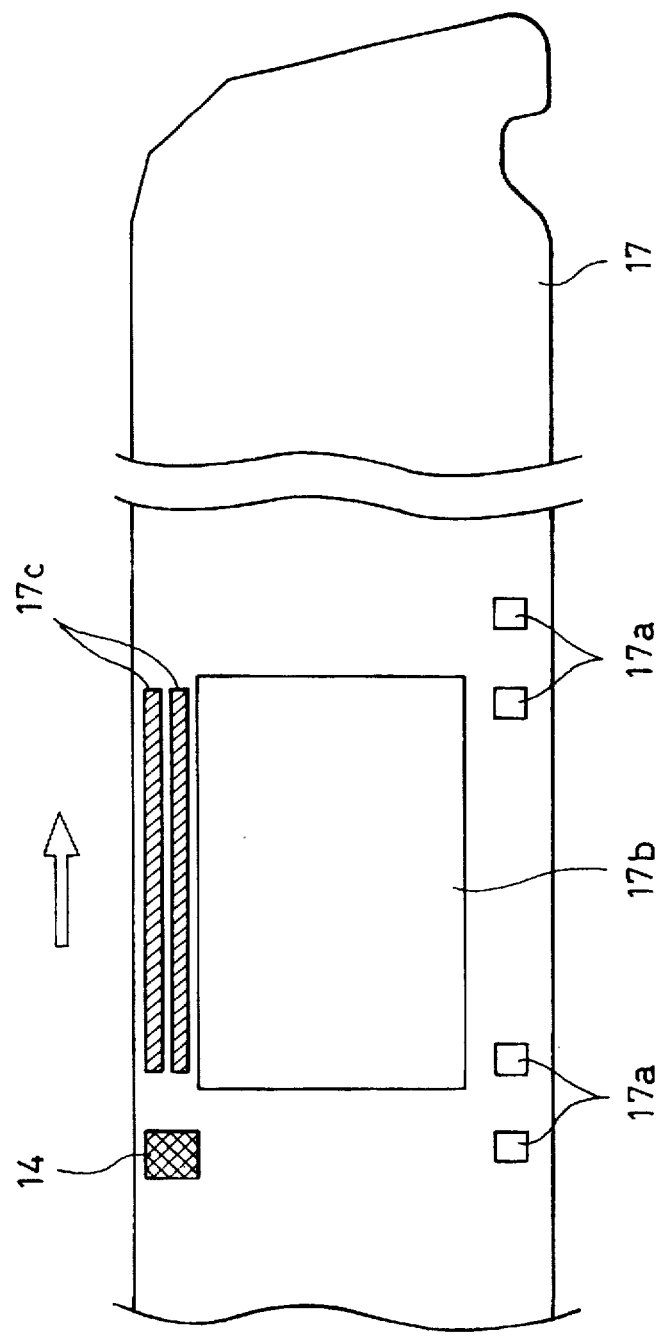

CAMERA USING FILM HAVING A MAGNETIC MEMORY PORTION

This application is a continuation of application Ser. No. 08/457,128 filed Jun. 1, 1995, now abandoned.

BACKGROUND OF THE INVENTION

1. Field of the Invention

The present invention relates to a camera designed to use a film having a magnetic memory portion and, more particularly, to an improvement in means for checking the performance of writing information in a magnetic memory portion of a film or reading out information from the memory portion.

2. Description of the Related Art

U.S. Pat. No. 4,864,332 discloses a camera which uses a film having a magnetic memory portion and in which photography information is written in the magnetic memory portion with a magnetic head.

The film used in this camera has a magnetic memory layer on the base surface side. The magnetic head is brought into contact with the film from the film pressure plate side to write photography information such as shutter speed, an aperture value, a data, and a title in the magnetic memory layer during film winding.

Japanese Patent Laid-Open No. 202830/1991 discloses a camera which uses the same kind of film and in which a film pressure plate is disposed so that the film gate aperture is not exposed in the direction along the optical axis. A magnetic head for writing is embedded in an end portion of this film pressure plate to suitably write photography information in a magnetic memory portion formed in an end portion of the film other than the photography frame area.

Japanese Patent Laid-Open No. 340942/1992 discloses a camera which uses the same kind of film and in which a cut-out portion is provided in each of a film pressure plate and a camera back member. In a state where the assembly of the camera is nearly completed, an exposure checking member is inserted and passed through the cut-out portions from the rear side of the camera to check through a light receiving element whether a suitable amount of exposure can be set.

In these cameras, the film feed system is arranged in such a manner that a film cartridge in which the entire film including the film leader is accommodated is used and the film is pushed out of the cartridge by the rotation of a supply spool in the film cartridge to which a driving output is transmitted through a fork of the camera. The film is thereby caused to pass through a gap (tunnel) formed between the film pressure plate and an internal portion of the camera body to be fed into a spool chamber. Only a small cartridge loading lid may suffice for the cartridge chamber in which the film cartridge is loaded, while a conventional type of rear cover to which a film pressure plate is integrally attached has generally been used.

In the above-described conventional cameras, however, the film pressure plate is designed so that no peripheral portion of the film gate or aperture is exposed and a camera back member attached at the rear of the film pressure plate is fixed so that the film pressure plate is not exposed. Therefore, troublesome operation is required for an adjustment step for checking whether photography information is correctly written in the magnetic memory portion of the film with the writing magnetic head.

In the case of the camera having a cut-out portion for checking the amount of exposure in the camera rear side, the cut-out portion is disposed generally at the center of film gate, since it is intended for exposure adjustment. It is necessary that the position at which a magnetic signal is to be written is close to the film upper end or lower end out of the photography frame area and at a large distance from the center. Therefore, such a cut-out portion cannot be utilized for reading a magnetic signal.

SUMMARY OF THE INVENTION

According to one aspect of the present invention, there is provided a camera or an apparatus adapted to use a film with a magnetic memory portion, or a device adapted for such a camera or an apparatus, the camera, apparatus or device comprising a magnetic head for at least one of writing information to the magnetic memory portion of the film and reading information from the magnetic memory portion, and a tool application portion for applying a tool for checking the performance of the magnetic head, whereby the performance of the magnetic head can easily be checked.

Other features and advantages of the present invention will become apparent from the following detailed description of the preferred embodiments of the invention.

BRIEF DESCRIPTION OF THE DRAWINGS

FIG. 7 is a plan view of a film showing the position of the magnetic head in accordance with the embodiments of the present invention.

DESCRIPTION OF THE PREFERRED EMBODIMENTS

The preferred embodiments of the present invention will be described with reference to the accompanying drawings.

Figure 1:
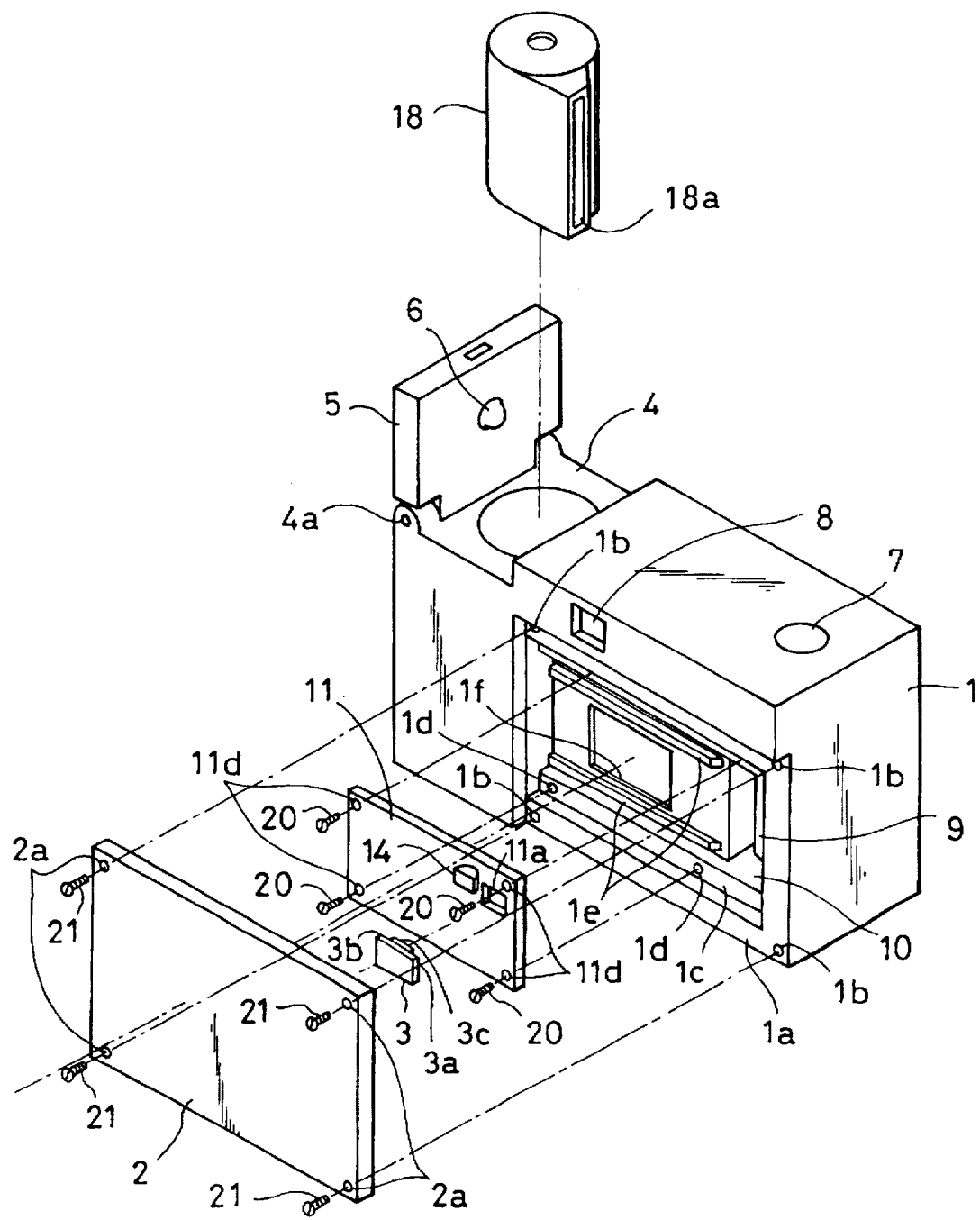
FIG. 1 is a perspective view of a camera using a film with a magnetic memory portion in accordance with a first embodiment of the present invention.
Figure 2:
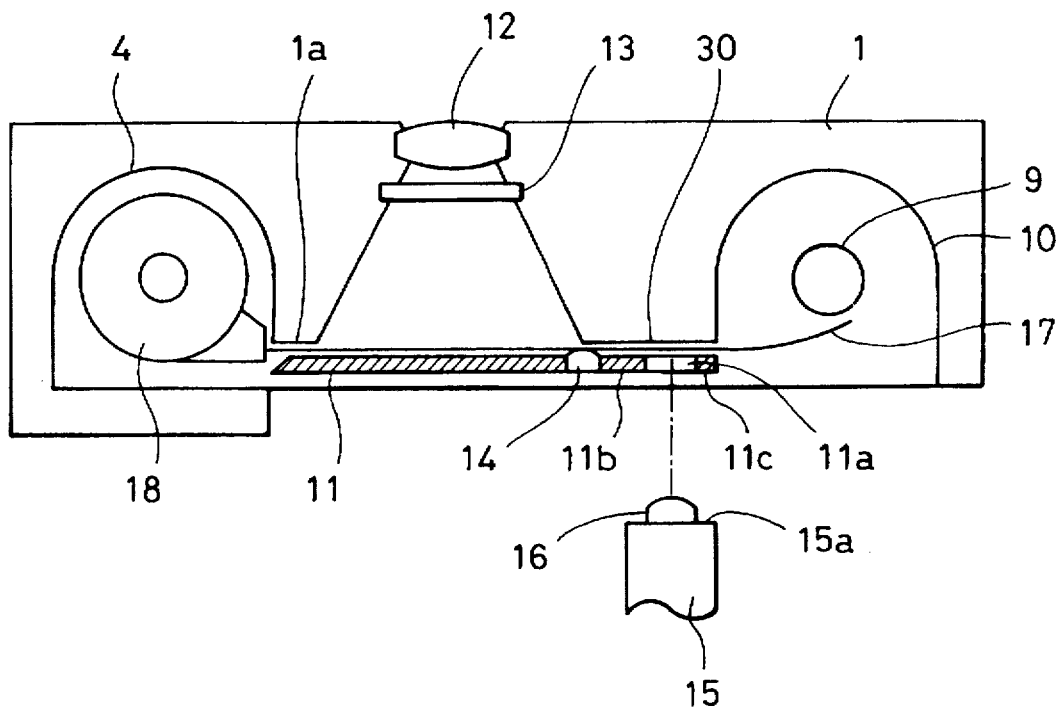
FIG. 2 is a cross-sectional view of the camera of the first embodiment shown in FIG. 1.

FIGS. 1, 2, and 7 illustrate a camera using a film with a magnetic memory portion in accordance with the first embodiment of the present invention.

Referring to FIG. 1, the camera has a camera body 1 which has a surface 1a to which a camera back member 2 is attached, screw holes 1b for attachment of the camera back member 2, surfaces 1c to which a film pressure plate 11 is attached, and which also serve as outer rails, screw holes 1d for attachment of the film pressure plate 11, inner rails 1e, and an aperture 1f.

A cut-out portion 11a is provided in the film pressure plate 11. As shown in FIG. 2, the cutout portion 11a includes receiving surfaces 11b and 11 against which received portions 3a and 3b of a lid 3 attached to the cut-out portion 11a are brought into abutment. A magnetic head 14 for writing a magnetic signal in a magnetic memory portion of a film 17 is also attached to the film pressure plate 11. The film pressure plate 11 is fixed on the camera body 1 with screws 20 driven into the screw holes 1d of the camera body 1 through screw holes 11d. The film 17 is passed through a gap (tunnel) 30 formed between the film pressure plate 11 and the camera body 1. In this embodiment, the cutout portion 11a is formed parallel to the writing magnetic head 14 along the direction in which the film 17 moves and on the film take-up spool 9 side of the magnetic head 14.

A film cartridge 18 in which the entire film 17 including the film leader is accommodated is set in a cartridge chamber 4. Then, a cartridge chamber lid 5 pivotally supported on a shaft 4a so as to be able of open and close the cartridge chamber 4 is closed, thus loading the camera with the film cartridge 18. A positioning pin 6 for positioning the film cartridge 18 is urged in a pressing direction by a spring (in an urging structure not shown in detail) to urge the film cartridge 18. The film 17 is pushed out of the film cartridge 18 through a port 18a of the same to move into the tunnel 30 and to be taken up by a film take-up spool 9 in a spool chamber 10.

The camera of this embodiment further has a release button 7, a finder 8, a photographing lens 12, a shutter 13 and other ordinary camera parts.

Referring then to FIG. 7, the film with a magnetic memory portion has perforations 17a for indicating positions of the film. Each perforation 17a is detected with an optical element such as a photoreflector (not shown) provided on the camera side to determine a film feed position.

The film 17 has a photographic frame area 17b which has a size approximately equal to that of the aperture 1f of the camera body 1. The arrow in FIG. 7 indicates the direction in which the film 17 moves. The film 17 has a magnetic recording portion 17c, and the magnetic head 14 is disposed at such a position as to be able to write a magnetic signal from the magnetic recording portion 17c or to read a magnetic signal from the magnetic recording portion 17c.

A checking tool 15 shown in FIG. 2 is used to check the state of a magnetic signal written by the writing magnetic head 14. The checking tool 15 has a reading magnetic head 16 attached to its extreme end.

The operation of the thus-constructed camera will next be described. In an adjustment step in a camera assembly process, after the film pressure plate 11 has been fixed by driving screws 20 into the screw holes 1d of the camera body 1 through screw holes 11d of the film pressure plate 11, an end surface 15a of the writing state checking tool 15 is brought into abutment against the receiving surfaces 11b and 11c of the cut-out portion 11a of the film pressure plate 11, whereby the front end gap of the reading magnetic head 16 is brought into contact with the magnetic recording portion 17c of the film 17. Thus, the reading magnetic head 16 is set in such a position as to be able to read a magnetic signal from the recording portion 17c.

On the other hand, the writing magnetic head 14, provided in the camera and mounted in the film pressure plate 11 to write photography information in the magnetic recording portion 17c of the film 17, has an adjustment mechanism for adjusting the front end gap of the writing magnetic head 14 so that the front end gap contacts the magnetic recording portion 17c at a correct angle, i.e., a correct rolling angle, azimuth angle or the like.

When the position of the writing magnetic head 14 attached to the film pressure plate 11 is adjusted, a magnetic signal for adjustment, for example, is written in the magnetic recording portion 17c of the film 17 with the writing magnetic head 14, and the magnetic signal written in the magnetic recording portion 17c with the writing magnetic head 14 is simultaneously read out with the reading magnetic head 16 of the checking tool 15 under the same feed conditions, i.e., in the same film 17 feed direction (winding direction) and at the same feed speed, thereby checking whether the magnetic signal output is at a prescribed level. If the azimuth angle or the like of the writing magnetic head 14 is not correct, the read output level of the magnetic signal written with the writing magnetic head 14 is reduced. In such a situation, the writing magnetic head 14 is adjusted so that the level of the magnetic signal output is equal to or higher than the prescribed output level.

When the adjustment operation according to the result of magnetic signal checking is finished, the received portions 3a and 3b of the lid 3 are brought into abutment against the receiving surfaces 11b and 11c of the cut-out portion 11a of the film pressure plate 11 to close the cut-out portion 11a with the lid 3. The lid 3 is fixed by screwing, bonding, welding, press-fitting or the like.

An end surface 3c of the lid 3 is formed so as to be flush with or slightly recessed from the surface of the film pressure plate 11 on the film 17 path side so as not to impede the travel of the film 17. Thereafter, the camera back member 2 is fixed by driving screws 21 into screw holes 1b of the camera body 1 through its screw holes 2a.

In the above-described first embodiment, when a magnetic signal is written in the magnetic recording portion 17c of the film with the writing magnetic head 14 under constant film feed conditions, the attachment adjustment of the writing magnetic head 14 can be simultaneously performed while the written magnetic signal is being read with the reading magnetic head 16. It is therefore possible to reduce the time required for the step of adjusting the writing magnetic head as well as to achieve more reliable adjustment.

Figure 3:
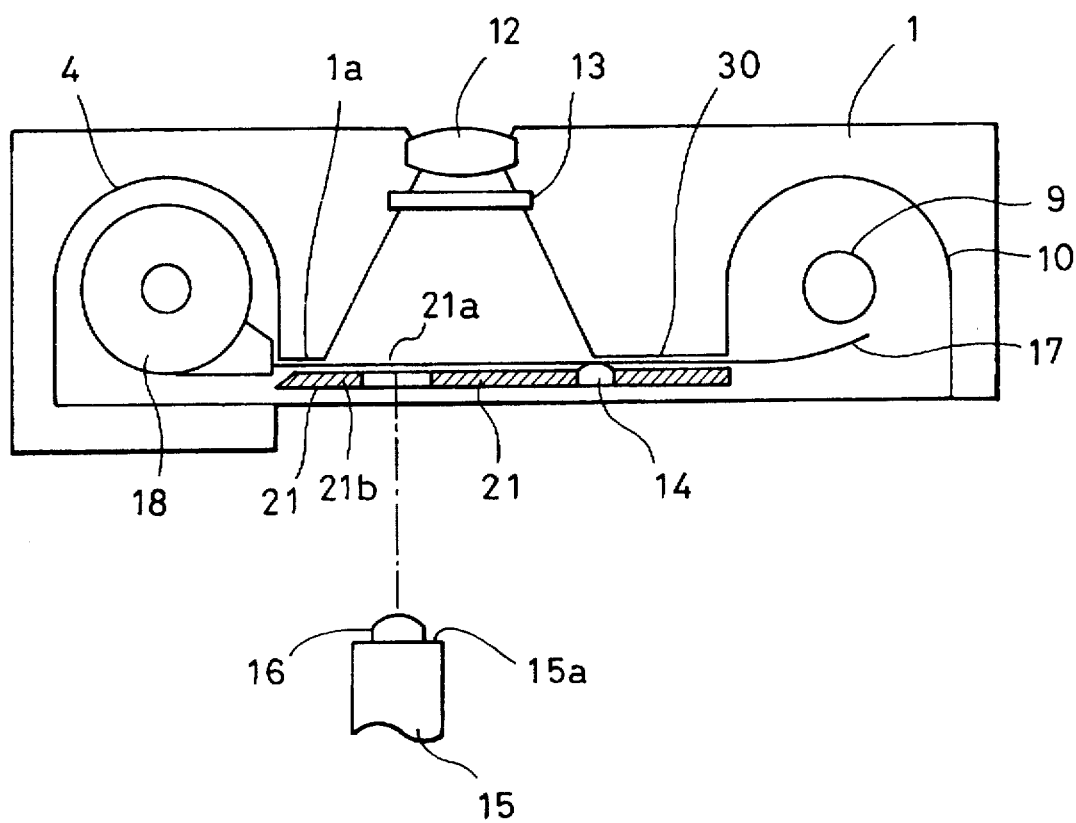
FIG. 3 is a cross-sectional view of a camera using film with a magnetic memory portion in accordance with a second embodiment of the present invention.

The second embodiment of the present invention will next be described. FIG. 3 is a cross-sectional view of a camera using a film with a magnetic memory portion in accordance with the second embodiment of the present invention. In FIG. 3, the same components as those of the first embodiment are indicated by the same reference characters.

In the embodiment shown in FIG. 3, a cut-out portion 21a through which a magnetic head 16 of a checking tool 15 is passed is formed in a film pressure plate 21 parallel to a writing magnetic head 14 along the direction in which film 17 moves and on the cartridge chamber 4 side opposite from that in the first embodiment. Also, receiving surfaces 21b and 21c against which received portions 3a and 3b of a lid are to be brought into abutment are provided in the film pressure plate 21. The other portions or components, which are the same as those of the first embodiment, are indicated by the same reference characters, and the description for them will not be repeated.

As in the first embodiment, the end surface 15a of the checking tool 15 is brought into abutment against the receiving surfaces 21b and 21c of the cut-out portion 21a of the film pressure plate 21. The reading magnetic head 16 is thereby set in such a position as to be able to read out a magnetic signal.

When the film 17 is wound around the take-up spool 9, a magnetic signal for testing, for example, is written in the magnetic recording portion 17c with respect to each frame with the writing magnetic head 14. After the film has been fully wound around the film take-up spool, the film 17 is rewound and the magnetic signal is collectively read out during rewinding to check the output from the reading magnetic head 16. The writing magnetic head 14 is adjusted on the basis of the result of checking. The assembly process after checking is the same as that of the first embodiment.

According to the second embodiment, as described above, reading and checking of the magnetic signal with the reading magnetic head 16 can be performed in sequence while the film 17 is being fed continuously and stably to be rewound, thereby enabling a writing non-uniformity or the like to be immediately checked.

Figure 4:
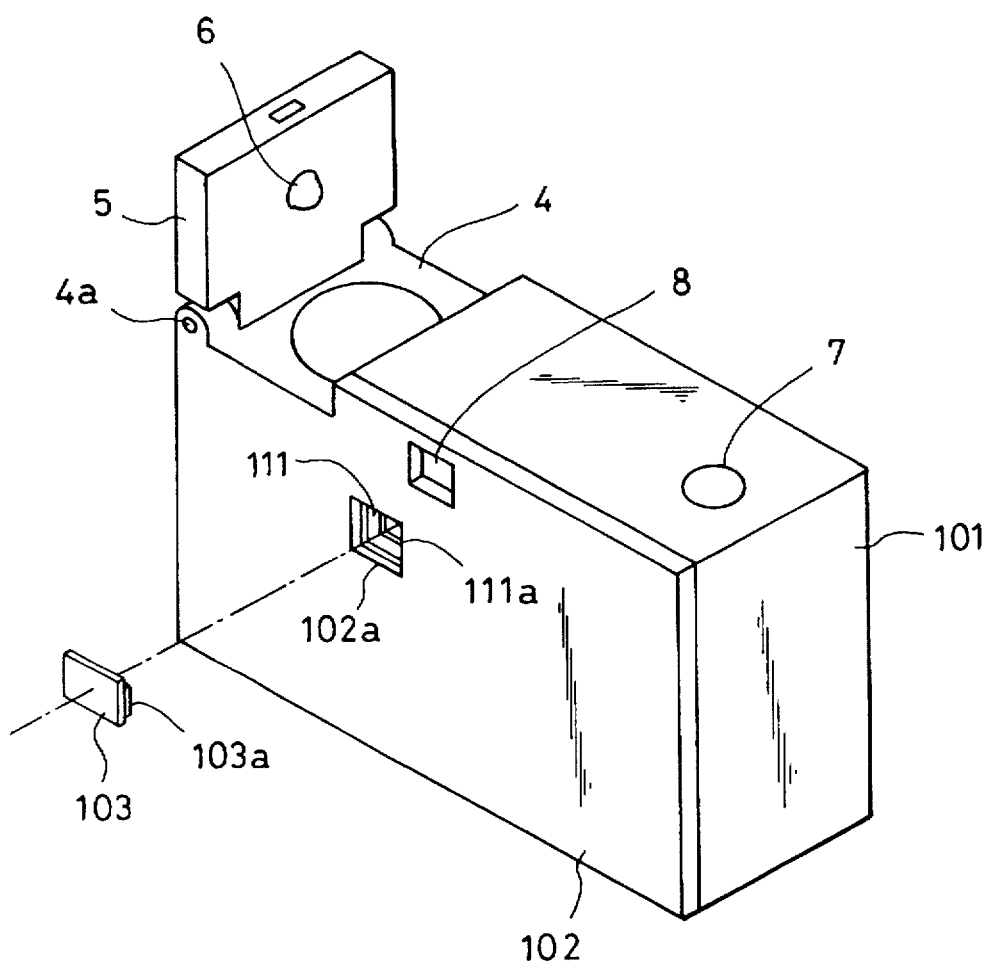
FIG. 4 is a perspective view of a camera using a film with a magnetic memory portion in accordance with a third embodiment of the present invention.
Figure 5:
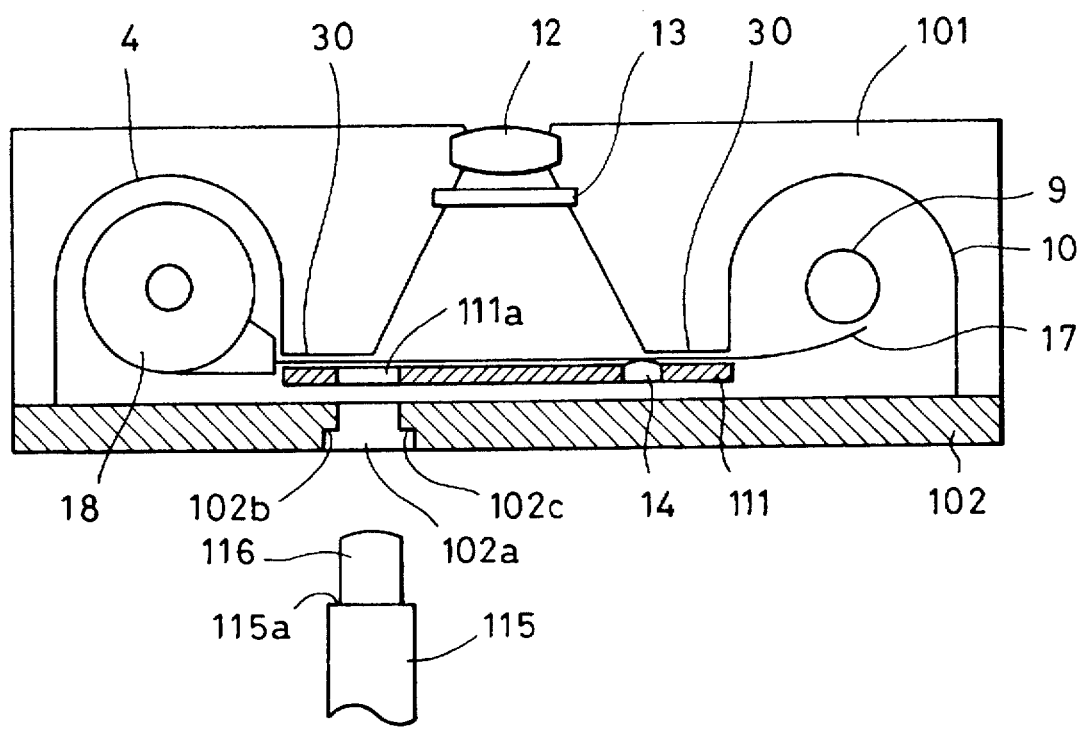
FIG. 5 is a cross-sectional view of the camera of the third embodiment shown in FIG. 4.

The third embodiment of the present invention will next be described with reference to FIGS. 4 and 5. FIG. 4 is a perspective view of a camera using a film with a magnetic memory portion in accordance with the third embodiment of the present invention. FIG. 5 is a longitudinal sectional view of the camera shown in FIG. 5. In FIGS. 4 and 5, the same components as those of the above-described embodiments are indicated by the same reference characters.

As shown in FIGS. 4 and 5, a camera back member 102 is fixed to a camera body 101, and a cut-out portion 102a having receiving portions 102b and 102c (shown in FIG. 5) is provided in the camera back member 102, and a lid 103 is attached to the cut-out portion 102a.

In a film pressure plate 111 fixed to the camera body 101, a cut-out portion 111a is provided at a position corresponding to that of the cut-out portion 102a of the camera back member 102. The film passes a gap (tunnel) 30 formed by the film pressure plate 111 and the camera body 101.

A reading magnetic head 116 for reading out a magnetic signal is provided on an extreme end of a tool 115 for checking the writing state of writing magnetic head 14. In this embodiment, the cutout portion 102a is positioned parallel to the writing magnetic head 14 along the direction in which the film 17 moves and on the cartridge 4 chamber side of the magnetic head 14. The other components identical to those of the first embodiment are indicated by the same reference characters and will not be specially described.

The operation of the arrangement shown in FIGS. 4 and 5 will be described. In a state where the camera is nearly completed by fixing the camera back member 102 to the camera body 101, an end surface 115a of the checking tool 115 is brought into abutment against the receiving surfaces 102b and 102c of the cut-out portion 102a of the camera back member 102. The reading magnetic head 116 is thereby set in such a position as to be able to read out a magnetic signal.

When the film 17 is wound around the take-up spool 9, a magnetic signal is written with the writing magnetic head 14. After the film has been fully wound around the film take-up spool, the film 17 is rewound and the magnetic signal is collectively read out during rewinding to check the output from the reading magnetic head 116.

When the operation of checking the magnetic signal is completed, the lid 103 is brought into abutment against the receiving portions 102b and 102c provided in the cut-out portion 102a of the camera back member 102 to close the cut-out portion 102a so that no light can leak. The lid 103 is fixed by screwing, bonding, welding, press-fitting or the like.

An end surface 103a of the lid 103 is formed so as to be flush with or slightly recessed from the surface of the film pressure plate 111 on the film 17 path side by considering the travel of the film 17.

According to the third embodiment, as described above, the magnetic signal can be collectively checked during rewinding of the film 17 in a state where the camera is nearly completed by attaching the camera back member 102. It is therefore possible to easily check the magnetic signal when the camera is nearly completed or during maintenance operation.

Figure 6:
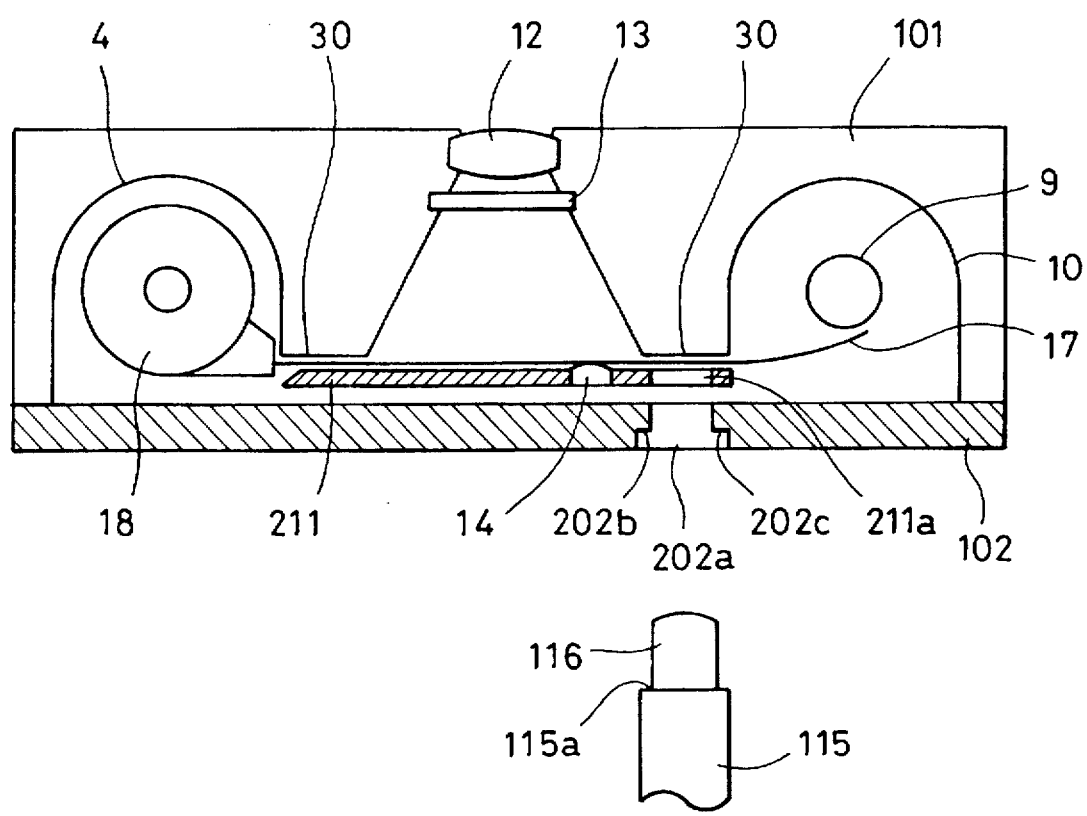
FIG. 6 is a cross-sectional view of a camera using film with a magnetic memory portion in accordance with a fourth embodiment of the present invention.

The fourth embodiment of the present invention will be described. FIG. 6 is a cross-sectional view of a camera using a film with a magnetic memory portion in accordance with the fourth embodiment of the present invention. In FIG. 6, the same components as those of the first embodiment are indicated by the same reference characters.

As shown in FIG. 6, a camera back member 101 is fixed to the rear end of a camera body 101, and has a cut-out portion 202a in which receiving portions 202b and 202c against which a lid 103 (identical to that illustrated in FIG. 4) are provided.

The cutout portion 202a is provided parallel to the writing magnetic head 14 along the direction in which the film 17 moves and on the film take-up spool 9 side of the magnetic head 14.

In a film pressure plate 211 fixed to the camera body 101, a cut-out portion 211a is provided at a position corresponding to that of the cut-out portion 202a of the camera back member 202. The film passes a gap (tunnel) 30 formed by the film pressure plate 211 and the camera body 101. The other components, which are the same as those of the third embodiment, are indicated by the same reference characters and the description for them will not be repeated.

The operation of the arrangement shown in FIG. 6 will be described. A reading magnetic head 116 provided on an extreme end of a checking tool 115 is passed through the cut-out portion 202a of the camera back member 202 and the cut-out portion 211a of the film pressure plate 211 so as to be brought into contact with the magnetic recording portion 17c of the film 17, with an end surface 115a of the tool 115 brought into abutment against the receiving surfaces 202b and 202c of the cut-out portion 202a of the camera back member 202. The reading magnetic head 116 is thereby set in such a position as to be able to read out a magnetic signal.

A magnetic signal is written on the film 17 with the writing magnetic head 14. During film winding, immediately thereafter, the magnetic signal is read out with the reading magnetic head 116 to check the output from the magnetic head 116.

When the checking operation is completed, the lid 103 is brought into abutment against the receiving portions 202b and 202c provided in the cut-out portion 202a of the camera back member 202 to close the cut-out portion 202a so that no light can pass therethrough. The lid 103 is fixed by screwing, bonding, welding, press-fitting or the like.

In the fourth embodiment, as described above, the cut-out portion 202a is formed in a film pressure plate 211 on the film take-up spool side of the writing magnetic head 14 opposite from that in the third embodiment. Accordingly, a magnetic signal written with the writing magnetic head 14 when the camera is in a nearly completed state is read out for output checking during film winding immediately after writing.

In the above-described embodiments, the magnetic head of the checking tool is used to read out information. However, it may be for writing information or both for reading out and writing information. In such a case, the tool is adapted to check the reading performance or both the writing performance and the reading performance of the magnetic head. The reading performance of the magnetic head may be checked with the tool by reversing the relationship between the magnetic head and the tool in the above-described embodiments.

Examples of checking the performance of the magnetic in the assembly process have been described with respect to the embodiments of the invention. Needless to say, the present invention can be applied to performance checking of the magnetic head after the completion of assembly, for example, when the magnetic head is malfunctioning.

The present invention can also be applied to any image recording medium other than photographic film.

The present invention can also be applied to any recording system other than the systems using electrical, optical and magnetic means for recording information on a film or reading out information from the film.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The individual components shown in schematic or block form in the drawing are all well-known in the camera arts and their specific construction and operation are not critical to the operation of best mode for carrying out the invention.

Further, according to the present invention, the above-described embodiments of technical elements may be combined as desired.

The present invention also comprises an arrangement in which the entire of a part of the claimed construction or the construction of the embodiments forms one unit, combines with other units, or constitutes a unit.

The present invention can also be applied to various kinds of cameras, such as single reflex cameras, lens shutter cameras and video cameras, optical apparatuses other than cameras, other kinds of apparatuses, apparatuses applicable to such cameras, optical apparatuses and apparatuses, and constituents of such cameras or apparatuses.

What is claimed is:

1. An apparatus adapted for a film with a magnetic memory portion, comprising:
    a magnetic head for at least one of writing information to the magnetic memory portion of the film and reading information from the magnetic memory portion; and
    a tool application portion for receiving an external tool applied thereto for checking a performance of said magnetic head by evaluating information processed through said magnetic head.

2. An apparatus according to claim 1, wherein said apparatus comprises a camera.

3. An apparatus according to claim 2, wherein said tool application portion includes access means for inserting the external tool.

4. An apparatus according to claim 2, wherein said tool application portion includes an opening for applying the external tool.

5. An apparatus according to claim 4, further comprising closing means for closing said opening.

6. An apparatus according to claim 5, wherein said closing means includes abutment means for preventing hindrance to the movement of the film by said closing means.

7. An apparatus according to claim 4, further comprising closing means for closing said opening so that no light can leak into said apparatus.

8. An apparatus according to claim 2, wherein said tool application portion includes read/write head means for enabling the tool to perform at least one of writing information to the magnetic memory portion of the film and reading information from the magnetic memory portion.

9. An apparatus according to claim 2, further comprising limit means for limiting a position of the film, said tool application portion being provided in said limit means.

10. An apparatus according to claim 9, wherein said limit means includes a pressure plate.

11. An apparatus according to claim 2, wherein said tool application portion includes read/write head means for enabling the tool to read information written in the magnetic memory portion of the film by said magnetic head, while the film is being transported.

12. An apparatus according to claim 2, wherein said tool application portion and said magnetic head are disposed side by side along a movement direction of the film.

13. An apparatus according to claim 12, further comprising a cartridge loading chamber for loading a cartridge containing the film, wherein said tool application portion is positioned between said magnetic head and said cartridge loading chamber.

14. An apparatus according to claim 12, further comprising a cartridge loading chamber for loading a cartridge containing the film, wherein said tool application portion is positioned farther from said cartridge loading chamber than said magnetic head.

15. An apparatus according to claim 2, wherein said tool application portion is provided in a body of said camera.

16. An apparatus according to claim 1, wherein said tool application portion includes access means for inserting the external tool.

17. An apparatus according to claim 1, wherein said tool application portion includes an opening for applying the external tool.

18. An apparatus according to claim 1, further comprising closing means for closing said opening.

19. An apparatus according to claim 18, wherein said closing means includes abutment means for preventing hindrance to the movement of the film by said closing means.

20. An apparatus according to claim 1, further comprising closing means for closing said opening so that no light can leak into said apparatus.

21. An apparatus according to claim 1, wherein said tool application portion includes read/write head means for enabling the tool to perform at least one of writing information to the magnetic memory portion of the film and reading information from the magnetic memory portion.

22. An apparatus according to claim 1, wherein said tool application portion includes read/write head means for enabling the tool to read information written in the magnetic memory portion of the film by said magnetic head, while the film is being transported.

23. An apparatus according to claim 1, wherein said tool application portion and said magnetic head are disposed side by side along a transporting direction of the film.

24. An apparatus according to claim 23, further comprising a cartridge loading chamber for loading a cartridge containing the film, wherein said tool application portion is positioned between said magnetic head and said cartridge loading chamber.

25. An apparatus according to claim 23, further comprising a cartridge loading chamber for loading a cartridge containing the film, wherein said tool application portion is positioned farther from said cartridge loading chamber than said magnetic head.

26. An apparatus according to claim 1, wherein said tool application portion is provided in a body of said apparatus.

27. An apparatus adapted for a film with a memory portion, comprising:

a head for at least one of writing information to the memory portion of the film and reading information from the memory portion; and a tool application portion for receiving an external tool for checking a performance of said head by analyzing information processed through said head.

28. An apparatus according to claim 27, wherein said apparatus comprises a camera.

29. An apparatus according to claim 28, wherein said tool application portion includes access means for inserting the external tool.

30. An apparatus according to claim 28, wherein said tool application portion includes an opening for applying the external tool.

31. An apparatus according to claim 27, wherein said tool application portion includes access means for inserting the external tool.

32. An apparatus according to claim 27, wherein said tool application portion includes an opening for applying the external tool.

33. An apparatus adapted for an image recording medium with a memory portion, comprising:

a head for at least one of writing information to the memory portion of the image recording medium and reading information from the memory portion; and a tool application portion for receiving an external tool for checking performance of said head by analyzing information processed through said head.

34. An apparatus according to claim 33, wherein said apparatus comprises a camera.

35. An apparatus according to claim 34, wherein said tool application portion includes access means for inserting the external tool.

36. An apparatus according to claim 34, wherein said tool application portion includes an opening for applying the external too.

37. An apparatus according to claim 33, wherein said tool application portion includes access means for inserting the external tool.

38. An apparatus according to claim 33, wherein said tool application portion includes an opening for applying the external tool.

* * * * *

UNITED STATES PATENT AND TRADEMARK OFFICE
CERTIFICATE OF CORRECTION

PATENT NO. : 5,749,007
DATED : May 5, 1998
INVENTOR(S) : HIROSHI SAKURAI

It is certified that error appears in the above-indentified patent and that said Letters Patent is hereby corrected as shown below:

ON THE TITLE PAGE:
At [30] FOREIGN APPLICATION PRIORITY DATA

Insert: --[30] Foreign Application Priority Data
           June 3, 1994  Japan ......6-144080.--.

Column 3

Line 13, "of" should read --to--.

Column 7

Line 3, "magnetic" should read --magnetic head--.
   Line 32, "of" (first occurrence) should read --or--.

Column 10

Line 16, "too." should read --tool.--.

Signed and Sealed this

Twenty-fourth Day of November, 1998

Attest:

BRUCE LEHMAN

Attesting Officer                Commissioner of Patents and Trademarks